(12) United States Patent
Krishnamurthi (10) Patent No.: US 11,262,206 B2
(45) Date of Patent: Mar. 1, 2022

(54) LANDMARK BASED ROUTING

(71) Applicant: GM Cruise Holdings LLC, San Francisco, CA (US)

(72) Inventor: Govindarajan Krishnamurthi, Palo Alto, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 13 days.

(21) Appl. No.: 16/845,502

(22) Filed: Apr. 10, 2020

(65) Prior Publication Data

US 2021/0318136 A1    Oct. 14, 2021

(51) Int. Cl.
*G01C 21/00*        (2006.01)
*G01C 21/36*        (2006.01)
*B60W 50/04*        (2006.01)
*B60W 60/00*        (2020.01)

(52) U.S. Cl.
CPC ....... *G01C 21/3644* (2013.01); *B60W 50/045* (2013.01); *B60W 60/001* (2020.02); *G01C 21/3608* (2013.01); *B60W 2050/046* (2013.01)

(58) Field of Classification Search
None
See application file for complete search history.

(56) References Cited

U.S. PATENT DOCUMENTS

2017/0278305 A1*  9/2017  Sisbot .............. G06T 19/006

* cited by examiner

*Primary Examiner* — James M McPherson
(74) *Attorney, Agent, or Firm* — Polsinelli, PC (57) ABSTRACT

The subject disclosure relates to ways to resolve autonomous vehicle (AV) routes based on verbal descriptions of landmark features. In some aspects, a process of the disclosed technology includes steps for receiving speech instructions, wherein the speech instructions indicate an autonomous vehicle (AV) destination, analyzing the speech instructions to identify one or more landmarks associated with the AV destination, and determining location information corresponding with the one or more landmarks. In some aspects, the process further includes calculating a route based on the location information corresponding with the one or more landmarks. Systems and machine-readable media are also provided.

18 Claims, 5 Drawing Sheets

LANDMARK BASED ROUTING

BACKGROUND

1. Technical Field

The subject technology provides solutions for resolving driving routes based on speech instructions and in particular, for determining autonomous vehicle (AV) routes based on identified landmarks.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Navigation instructions commonly include location descriptions that reference environmental features used to convey a person's whereabouts. Such instructions are often provided verbally, and sometimes make reference to dynamic environmental features (such as the location of cars or other transient objects). However, conventional navigation systems are not able to consume and use such information, for example, to inform navigation and route planning.

Aspects of the disclosed technology address the foregoing limitations of conventional navigation and routing systems by providing solutions for extracting navigation cues from speech data, and for identifying salient environmental characteristics (e.g., landmarks) that can be used to identify precise map locations. By resolving map location information from spoken environmental cues, the disclosed technology enables navigation systems that can facilitate dispatch, navigation and routing functions in autonomous vehicle (AV) deployments. As discussed in further detail below, methods and systems of the disclosed technology enable AV navigation and routing systems that are capable of determining map destinations, e.g., for passenger pick-up or drop-off, based on spoken (verbal) descriptions that contain salient location information. Such features allow users (riders) to deliver location instructions to an AV ride service provider, without the need to provide precise address or geolocation information.

As used herein, "landmark" can be used to describe virtually any type of environmental description of navigation instruction that can be used to determine or infer a map location. In some aspects, landmarks may describe static environmental features, (e.g., buildings, roadways, parks, and/or statues, etc.). In other aspects, landmarks may describe dynamic environmental features, such as billboards, and/or descriptions of traffic features, such as the configuration of cars or busses at a specific location on a given roadway. Landmarks can also include descriptions of the surrounding environment, such as reference to "a mound of dirt," or a temporary road or road sign. That is, landmarks can include any identifiable feature in the environment that may be used to convey location information. As discussed in further detail below, landmarks can be extracted from user provided data, such as speech data, text, and/or gestures (e.g., sign language commands), and used to identify precise map locations, for example, to facilitate the navigation and routing functions of an AV.

Figure 1:
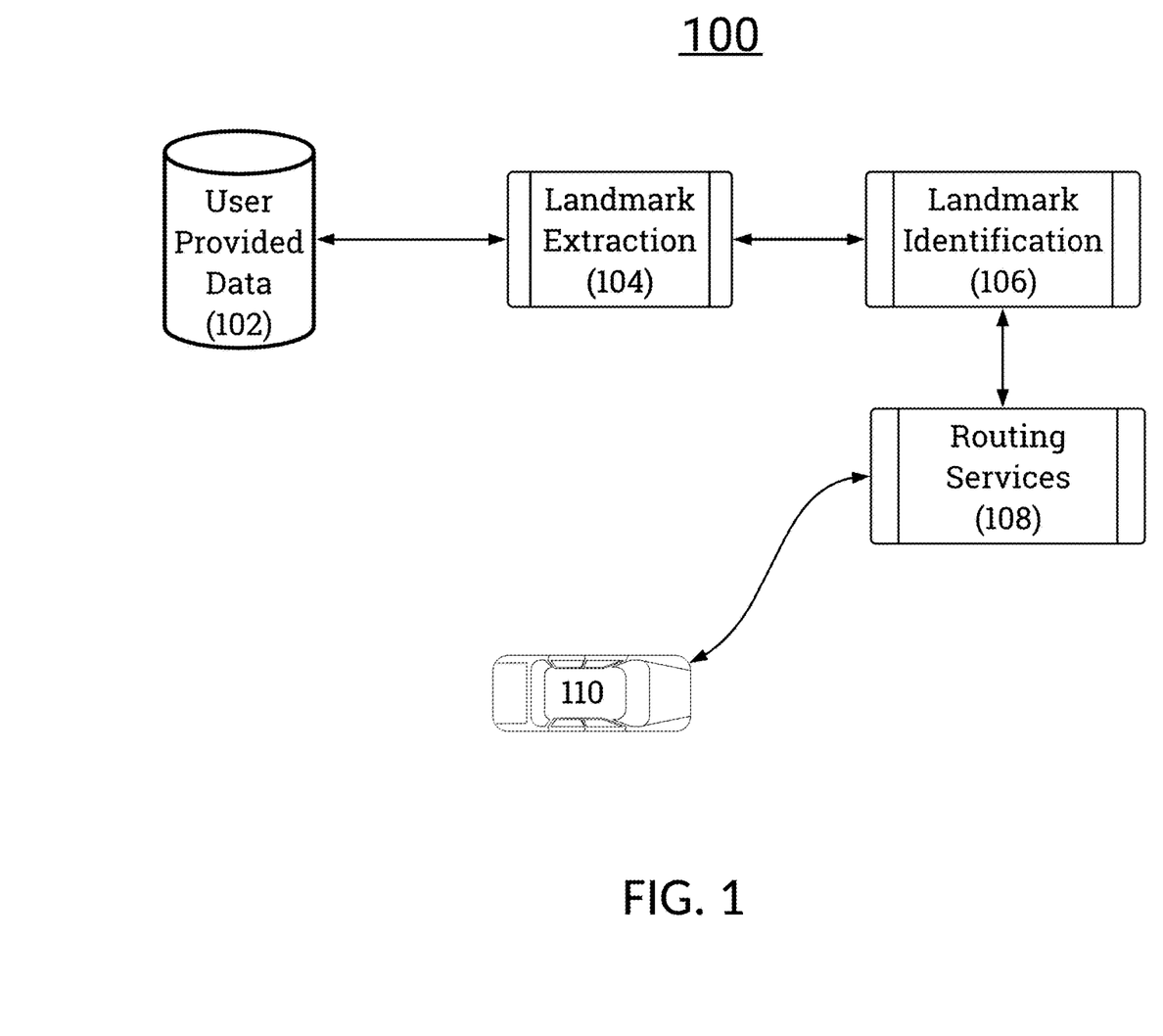
FIG. 1 illustrates an example system environment in which some aspects of the disclosed technology can be implemented.

FIG. 1 illustrates an example environment 100 in which some aspects of the disclosed technology can be implemented. Environment 100 includes a user provided data repository 102, a landmark extraction module 104, a landmark identification module 106, and a routing services process 108. User provided data 102 can represent speech data and/or text data that is stored to a data repository (database), or that is received in real-time (or near real time) by landmark extraction module 104, for example, via a communication channel such as a telephone network, or via the Internet. In some aspects, user provided data 102 may also be bundled with other types of information or metadata, such as geolocation coordinate information, for example, of a speaker or user that is providing the spoken instructions.

In practice, landmark extraction module 104 is configured to parse user provided data 102 to identify one or more landmarks contained therein. By way of example, user provided data 102 can include descriptions of static landmark features (e.g., a "bridge," or a "building," etc.), that describe a particular location of interest. User provided data 102 may include descriptions of dynamic landmark features, e.g., locations of cars, pedestrians, or other movable objects. Once landmark extraction module 104 has identified and extracted the relevant landmarks from user provided data 102, the landmarks, e.g., landmark data, is provide to landmark identification module 106.

Landmark identification module 106 is configured to identify map locations that correspond with the landmarks extracted by landmark extraction module 104. As discussed in further detail with respect to FIG. 2, such determinations may be made by referencing one or more map databases, such as a semantic map database, and/or by comparing landmark labels to semantic labels for collected environmental data. Once landmark identification module 106 has identified map locations corresponding with the extracted landmarks, then the location information associated with the landmarks can be provided to a routing services process 108, for example, to facilitate the resolution of an AV destination end-point. In some aspects, routing services process can analyze relationships between map locations based on the extracted landmarks, and determine an optimal route for a dispatched AV. Destination and routing information can then be sent to a receiving AV, such as AV 110, depicted in environment 100.

Figure 2:
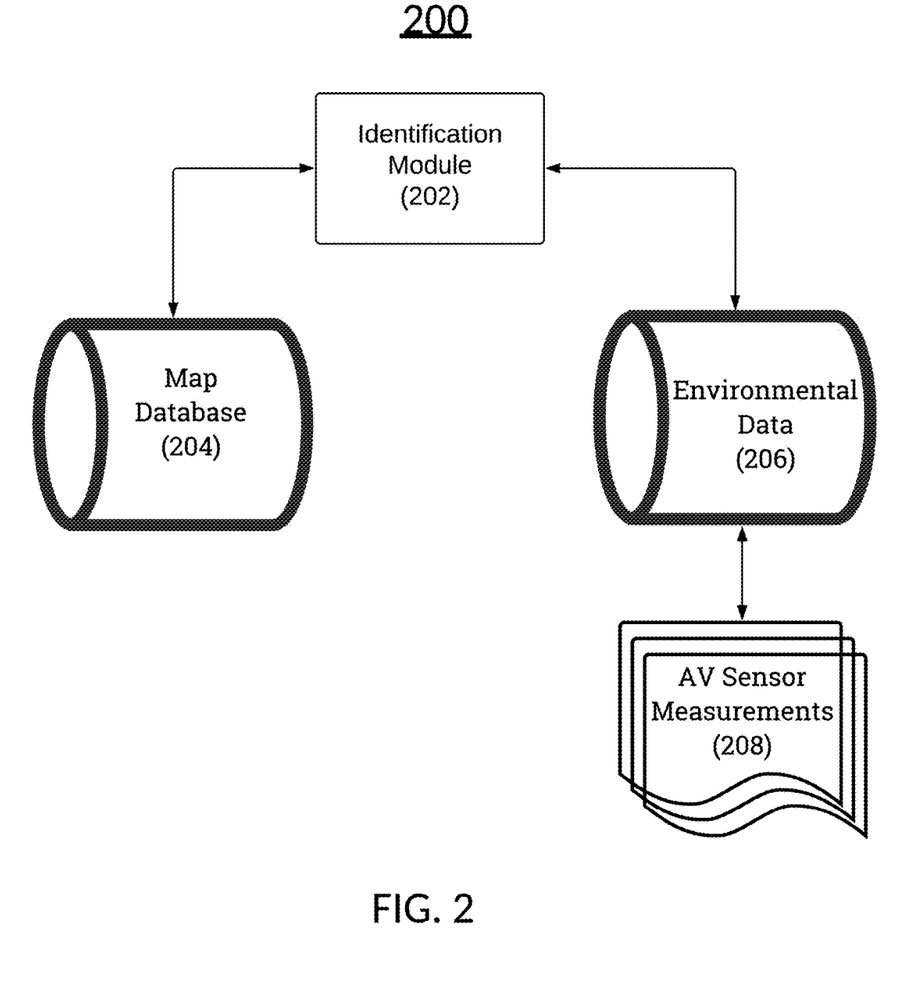
FIG. 2 illustrates an example landmark identification system, according to some aspects of the disclosed technology.

FIG. 2 illustrates a conceptual block diagram 200 of an example landmark extraction module 202 of the disclosed technology. As discussed above, landmark extraction module 202 may utilize one or more map databases to determine location information corresponding with various landmark features. As illustrated in the example of FIG. 2, landmark extraction module 202 is configured to query a map database 204, and/or an environmental data store 206 to determine location information (e.g., a map location) associated with each landmark.

By way of example, for static landmarks, a semantic label associated with the landmark may be used to query map database 204 to determine location information for map features having similar or matching semantic labels. By way of example, if the landmark is "theatre," then the semantic labels matching the "theatre" label may be searched in map database 204 to determine corresponding location information. In some aspects, only labels for certain areas of the map may be searched. For example, geolocation information such as Geolocation Positioning System (GPS) coordinates received with the speech data may provide rough indications of a map region in which semantic labels for landmarks should be searched. By using such metadata, semantic map labels may be segmented such that those regions of the map having the highest probability of containing the landmark feature are searched, while other portions of the map are ignored.

In some aspects, multiple semantic labels (corresponding with multiple) map features may correlated to yield more relevant map results. By way of example, if the extracted landmarks include "bridge", and "theatre," then theatre locations near a bridge may be deemed more relevant than theatre locations not proximate to any bridge. In other aspects, the semantic labels may include descriptive terms that identify an object in the environment, such as "steel bridge with arches" or "building with red paint," etc. In this manner, a greater number of landmark features may improve the ability of identification module 202 to resolve location information for each individual feature.

In some aspects, environmental data 206 may be used to determine location information for one or more landmarks. For example, where dynamic landmarks are indicated in the speech data, such as described locations of cars, pedestrians, or other environmental objects such features may not be represented in map database 204. In such instances, real-time or near-real time environmental data 206 may be used to identify the described landmark features. As used herein, environmental data 206 can include sensor data that is collected by one or more environmental sensor from one or more AVs in a fleet. Environmental data 206 may also include third-party data that provides measurements of environmental features for a particular map area. By way of example, environmental data may include Light Detection and Ranging (LiDAR) data collected along with one or more AV sensor measurements 208. It is understood that other sensor modalities, such as cameras, are also contemplated, without departing from the scope of the disclosed technology.

In instances where dynamic landmark cues are provided in the received speech data, the dispatched AV can collect and analyze sensor data as it attempts to navigate to the intended destination location. By way of example, if the provided dynamic landmarks include "blue bus," and "large billboard," then the collected AV sensor measurements can be processed to determine if the AV has encountered those landmarks. In some aspects, AV fleet intelligence is contemplated, environmental data collected by any AV in an AV fleet can be used to identify the dynamic landmarks and corresponding location information. In this way, landmark locations may be more easily resolved, without the need for the dispatched AV to actually encounter or process environmental data for the provided landmarks. That is, the landmarks may be "found" by other AV's in the fleet.

Figure 3:
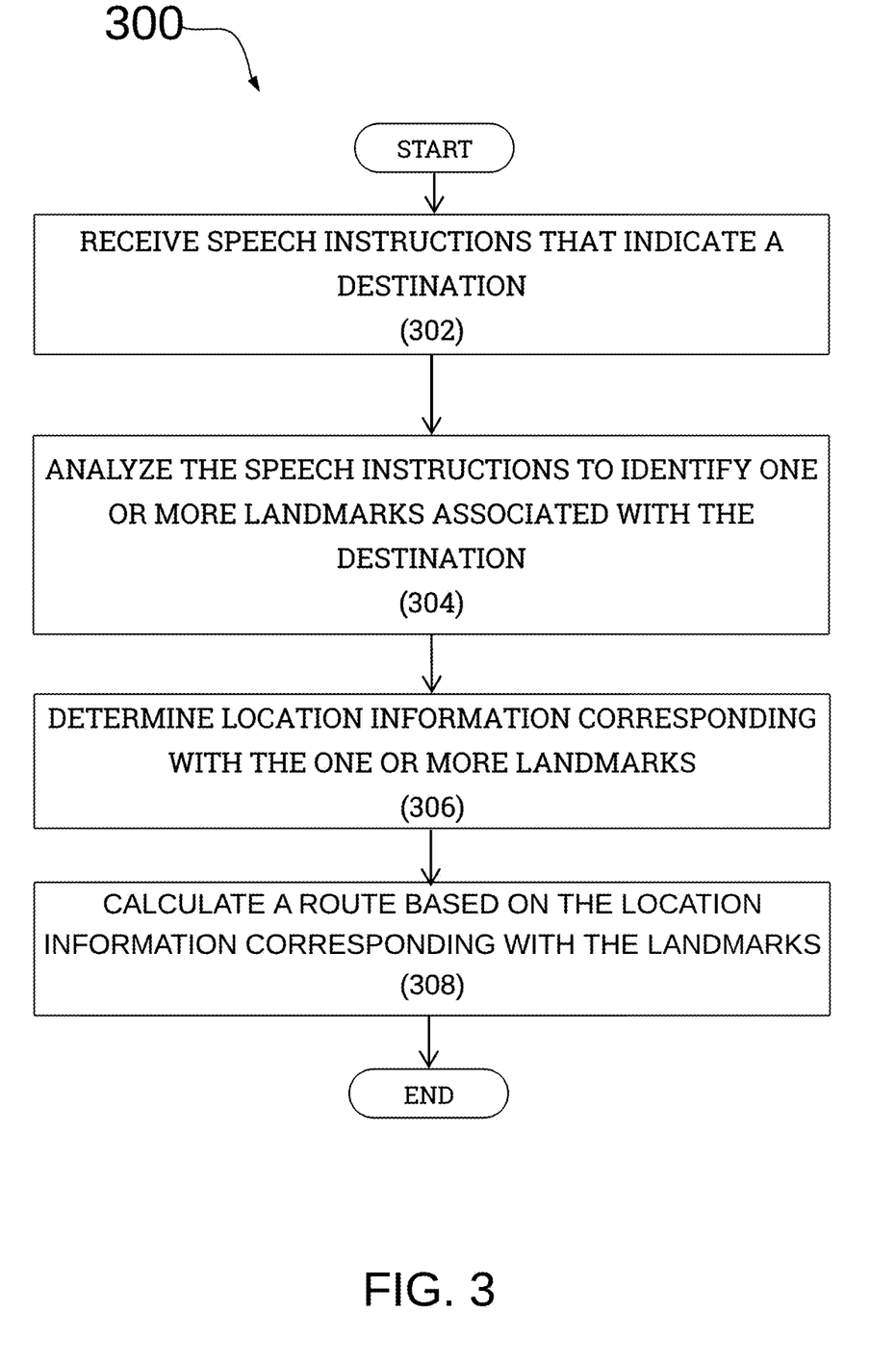
FIG. 3 illustrates steps of an example process for calculating an autonomous vehicle (AV) route based on landmarks identified from speech instructions, according to some aspects of the disclosed technology.

FIG. 3 illustrates steps of an example process 300 for calculating an autonomous vehicle (AV) route based on landmarks identified from speech instructions, according to some aspects of the disclosed technology. Process 300 begins with step 302 in which speech instructions are received (e.g., by a landmark extraction module), wherein the speech instructions provide descriptions of an intended destination location. As discussed above, the destination location may correspond with a pick-up or drop-off location for one or more passengers of an AV ride sharing service.

In step 304, the speech instructions are analyzed to identify and extract one or more landmarks associated with the AV destination. Identification and extraction of the landmarks may include natural-language processing necessary to segment the speech data, and to convert spoken landmark names, labels and/or descriptions into semantic labels. For example, landmark extraction may include machine-learning approaches, such as the use of deep learning to identify landmarks in speech data. Similar machine-learning and/or pattern recognition techniques may be deployed for different forms of user provided data, including but not limited to speech, text, and or visual signals, such as sign language commands, etc.

In step 306, location information corresponding with the one or more landmarks is determined. As discussed above, determination of location (e.g., map location) information for the landmarks may be performed by a landmark identification module, such as landmark identification module 106, discussed with respect to FIG. 1, and/or identification module 202, discussed with respect to FIG. 2, above.

In step 308, a route is calculated based on the location information corresponding with the one or more landmarks. In some aspects, the route may be provided to an AV, for example, that is dispatched to the destination location that is described by the speech instructions.

Figure 4:
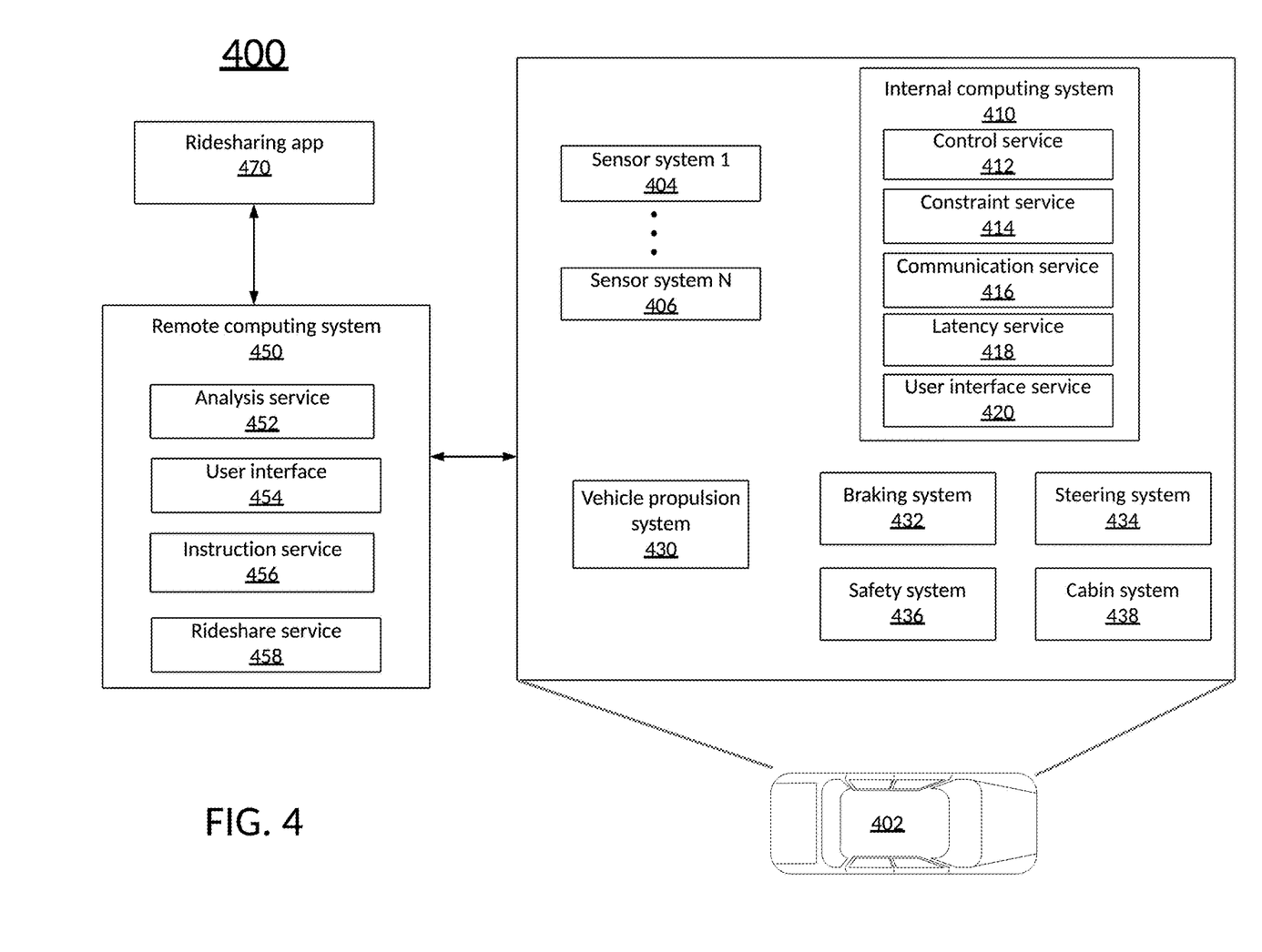
FIG. 4 illustrates an example system environment that can be used to facilitate AV dispatch and operations, according to some aspects of the disclosed technology.

FIG. 4 illustrates an example system environment that can be used to facilitate AV dispatch and operations, according to some aspects of the disclosed technology. Autonomous vehicle 402 can navigate about roadways without a human driver based upon sensor signals output by sensor systems 404-406 of autonomous vehicle 402. Autonomous vehicle 402 includes a plurality of sensor systems 404-406 (a first sensor system 104 through an Nth sensor system 106). Sensor systems 404-406 are of different types and are arranged about the autonomous vehicle 402. For example, first sensor system 404 may be a camera sensor system and the Nth sensor system 406 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 480 are illustrated coupled to the autonomous vehicle 402, it is understood that more or fewer sensors may be coupled to the autonomous vehicle 402.

Autonomous vehicle 402 further includes several mechanical systems that are used to effectuate appropriate motion of the autonomous vehicle 402. For instance, the mechanical systems can include but are not limited to, vehicle propulsion system 430, braking system 432, and steering system 434. Vehicle propulsion system 430 may include an electric motor, an internal combustion engine, or both. The braking system 432 can include an engine brake, brake pads, actuators, and/or any other suitable componentry that is configured to assist in decelerating autonomous vehicle 402. In some cases, braking system 432 may charge a battery of the vehicle through regenerative braking. Steering system 434 includes suitable componentry that is configured to control the direction of movement of the autonomous vehicle 402 during navigation. Autonomous vehicle 402 further includes a safety system 436 that can include various lights and signal indicators, parking brake, airbags, etc. Autonomous vehicle 402 further includes a cabin system 438 that can include cabin temperature control systems, in-cabin entertainment systems, etc.

Autonomous vehicle 402 additionally comprises an internal computing system 410 that is in communication with sensor systems 480 and systems 430, 432, 434, 436, and 438. Internal computing system 410 includes at least one processor and at least one memory having computer-executable instructions that are executed by the processor. The computer-executable instructions can make up one or more services responsible for controlling autonomous vehicle 402, communicating with remote computing system 450, receiving inputs from passengers or human co-pilots, logging metrics regarding data collected by sensor systems 480 and human co-pilots, etc.

Internal computing system 410 can include a control service 412 that is configured to control operation of vehicle propulsion system 430, braking system 208, steering system 434, safety system 436, and cabin system 438. Control service 412 receives sensor signals from sensor systems 480 as well communicates with other services of internal computing system 410 to effectuate operation of autonomous vehicle 402. In some embodiments, control service 412 may carry out operations in concert one or more other systems of autonomous vehicle 402. Internal computing system 410 can also include constraint service 414 to facilitate safe propulsion of autonomous vehicle 402. Constraint service 416 includes instructions for activating a constraint based on a rule-based restriction upon operation of autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 412.

The internal computing system 410 can also include communication service 416. The communication service 416 can include both software and hardware elements for transmitting and receiving signals from/to the remote computing system 450. Communication service 416 is configured to transmit information wirelessly over a network, for example, through an antenna array that provides personal cellular (long-term evolution (LTE), 3G, 4G, 5G, etc.) communication.

Internal computing system 410 can also include latency service 418. Latency service 418 can utilize timestamps on communications to and from remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, latency service 418 can enable other systems of autonomous vehicle 402 or a passenger to make necessary decisions or to provide the needed feedback.

Internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 440 regarding reporting data for training and evaluating machine learning algorithms, requesting assistance from remote computing system 450 or a human operator via the remote computing system 450, software service updates, rideshare pickup and drop off instructions, etc.

Remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402. Remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

Remote computing system 450 can also include an instruction service 456 for sending instructions regarding the operation of the autonomous vehicle 402. For example, in response to an output of the analysis service 452 or user interface service 454, instructions service 456 can prepare instructions to one or more services of the autonomous vehicle 402 or a co-pilot or passenger of the autonomous vehicle 402. Remote computing system 450 can also include rideshare service 458 configured to interact with ridesharing applications 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle to 402 go around an obstacle, change routes, honk the horn, etc. Remote computing system 450 can, in some cases, include at least one computing system 450 as illustrated in or discussed with respect to FIG. 5, or may include at least a subset of the components illustrated in FIG. 5 or discussed with respect to computing system 450.

Figure 5:
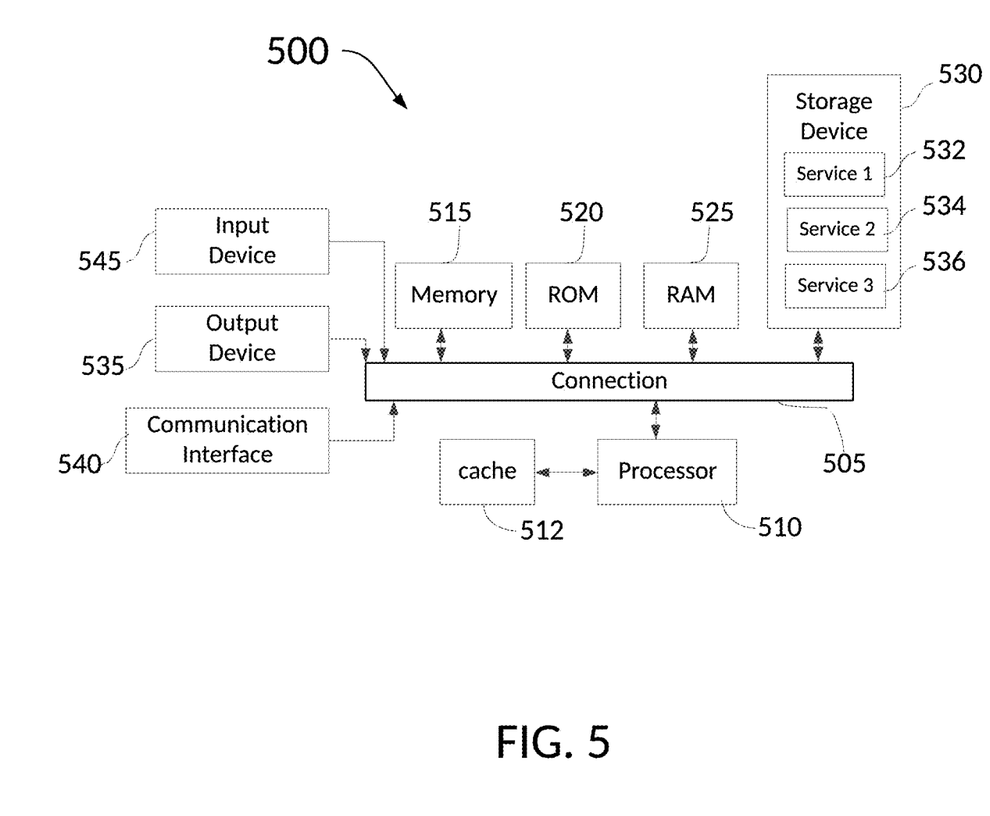
FIG. 5 illustrates an example processor-based system with which some aspects of the subject technology can be implemented.

FIG. 5 illustrates an example processor-based system with which some aspects of the subject technology can be implemented. For example, processor-based system 500 that can be any computing device making up internal computing system 410, remote computing system 450, a passenger device executing the rideshare app 470, internal computing device 430, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD)

card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

FIG. 5 illustrates an example processor-based system with which some aspects of the subject technology can be implemented. Specifically, FIG. 5 illustrates system architecture 500 wherein the components of the system are in electrical communication with each other using a bus 505. System architecture 500 can include a processing unit (CPU or processor) 510, as well as a cache 512, that are variously coupled to system bus 505. Bus 505 couples various system components including system memory 515, (e.g., read only memory (ROM) 520 and random access memory (RAM) 525, to processor 510.

System architecture 500 can include a cache of high-speed memory connected directly with, in close proximity to, or integrated as part of the processor 510. System architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. Memory 515 can include multiple different types of memory with different performance characteristics. Processor 510 can include any general purpose processor and a hardware module or software module, such as module 1 (532), module 2 (534), and module 3 (536) stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms. In some instances, multimodal systems can enable a user to provide multiple types of input to communicate with the computing system architecture 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include software modules 532, 534, 536 for controlling processor 510. Other hardware or software modules are contemplated. Storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out various functions of the disclosed technology.

By way of example, instruction stored on computer-readable media can be configured to cause one or more processors to perform operations including: receiving, at an AV computing system, a first dispatch request, wherein the first dispatch request is associated with a first user identifier (ID), receiving, at the AV computing system, a first recognition model, wherein the first recognition model corresponds with the first user ID, receiving, at the AV computing system, an image stream comprising one or more images of pedestrian faces, and providing the one or more images to the first recognition model. In some aspects, the instructions can further cause processors 510 to perform operations for: determining, using the first recognition model, if a first user represented in the one or more images corresponds with the first user ID, unlocking a door of the AV in response to a match between at least one of the one or more images and the first user ID, and/or updating the first recognition model in response to a match between at least one of the one or more images and the first user ID.

In some aspects, memory stored operations/instructions can be configured to further cause processors 510 to perform operations for: receiving a second recognition model corresponding with a second user ID, providing the one or more images to the second recognition model, and determining, using the second recognition model, if a second user represented by the one or more images corresponds with the second user ID. In some approaches, the operations may further cause the processors to perform operations for unlocking a door of the AV in response to a match between at least one of the one or more images and the second user ID.

Depending on the desired implementation, the first recognition model can be a machine-learning model that has been trained using a plurality of facial images of the first user, and wherein the second recognition model is a machine-learning model that has been trained using a plurality of facial images of the second user.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method comprising:
   receiving, by a landmark identification module, speech instructions indicating an autonomous vehicle (AV) destination, and wherein the speech instructions comprise Global Positioning System (GPS) coordinate metadata associated with the AV destination;
   retrieving from a map database, by the landmark identification module, a plurality of map labels;
   segmenting, by the landmark identification module, the plurality of map labels based on the GPS coordinate metadata associated with the AV destination;
   analyzing the speech instructions to identify one or more landmarks associated with the AV destination;
   determining location information corresponding with the one or more landmarks; and
   calculating a route based on the location information corresponding with the one or more landmarks.

2. The computer-implemented method of claim 1, wherein determining the location information corresponding with the one or more landmarks further comprises:
   comparing the one or more landmarks associated against a semantic map database.

3. The computer-implemented method of claim 1, wherein determining the location information corresponding with the one or more landmarks further comprises:
   collecting environmental data comprising the one or more landmarks; and
   determining semantic labels for each of the one or more landmarks.

4. The computer-implemented method of claim 1, wherein the one or more landmarks comprises at least one dynamic map artifact.

5. The computer-implemented method of claim 1, wherein the one or more landmarks comprises at least one static map artifact.

6. The computer-implemented method of claim 1, wherein the speech instructions comprise one or more driving instructions.

7. A system comprising:
   one or more processors; and
   a computer-readable medium comprising instructions stored therein, which when executed by the processors, cause the processors to perform operations comprising:
   receiving, by a landmark identification module, speech instructions indicating an autonomous vehicle (AV) destination, and wherein the speech instructions comprise Global Positioning System (GPS) coordinate metadata associated with the AV destination;
   retrieving from a map database, by the landmark identification module, a plurality of map labels;
   segmenting, by the landmark identification module, the plurality of map labels based on the GPS coordinate metadata associated with the AV destination;

analyzing the speech instructions to identify one or more landmarks associated with the AV destination;

determining location information corresponding with the one or more landmarks; and calculating a route based on the location information corresponding with the one or more landmarks.

8. The system of claim 7, wherein determining the location information corresponding with the one or more landmarks further comprises:

comparing the one or more landmarks associated against a semantic map database.

9. The system of claim 7, wherein determining the location information corresponding with the one or more landmarks further comprises:

collecting environmental data comprising the one or more landmarks; and determining semantic labels for each of the one or more landmarks.

10. The system of claim 7, wherein the one or more landmarks comprises at least one dynamic map artifact.

11. The system of claim 7, wherein the one or more landmarks comprises at least one static map artifact.

12. The system of claim 7, wherein the speech instructions comprise one or more driving instructions.

13. A non-transitory computer-readable storage medium comprising instructions stored therein, which when executed by one or more processors, cause the processors to perform operations comprising:

receiving, by a landmark identification module, speech instructions indicating an autonomous vehicle (AV) destination, and wherein the speech instructions comprise Global Positioning System (GPS) coordinate metadata associated with the AV destination;

retrieving from a map database, by the landmark identification module, a plurality of map labels;

segmenting, by the landmark identification module, the plurality of map labels based on the GPS coordinate metadata associated with the AV destination;

analyzing the speech instructions to identify one or more landmarks associated with the AV destination;

determining location information corresponding with the one or more landmarks; and calculating a route based on the location information corresponding with the one or more landmarks.

14. The non-transitory computer-readable storage medium of claim 13, wherein determining the location information corresponding with the one or more landmarks further comprises:

comparing the one or more landmarks associated against a semantic map database.

15. The non-transitory computer-readable storage medium of claim 13, wherein determining the location information corresponding with the one or more landmarks further comprises:

collecting environmental data comprising the one or more landmarks; and determining semantic labels for each of the one or more landmarks.

16. The non-transitory computer-readable storage medium of claim 13, wherein the one or more landmarks comprises at least one dynamic map artifact.

17. The non-transitory computer-readable storage medium of claim 13, wherein the one or more landmarks comprises at least one static map artifact.

18. The non-transitory computer-readable storage medium of claim 13, wherein the speech instructions comprise one or more driving instructions.

* * * * *